United States Patent [19]
Kano et al.

[11] Patent Number: 6,017,579
[45] Date of Patent: Jan. 25, 2000

[54] METHOD OF FORMING MAGNESIUM OXIDE FILMS ON GLASS SUBSTRATE FOR USE IN PLASMA DISPLAY PANELS

[75] Inventors: Gota Kano, Kyoto, Japan; Carlos A. Paz De Araujo, Colorado Springs, Colo.; Koji Arita, Colorado Springs, Colo.; Michael C. Scott, Colorado Springs, Colo.; Larry D. McMillan, Colorado Springs, Colo.; Shinichiro Hayashi, Colorado Springs, Colo.

[73] Assignees: Symetrix Corporation, Colorado Springs, Colo.; Matsushita Electronics Corporation, Japan

[21] Appl. No.: 08/838,006

[22] Filed: Apr. 14, 1997

[51] Int. Cl.[7] .......................................................... B05D 5/12
[52] U.S. Cl. ........................... 427/126.2; 427/64; 427/68; 427/126.3; 427/162; 427/165; 427/226; 427/240; 427/108; 427/377; 427/378; 427/384; 427/430.1
[58] Field of Search ..................................... 427/226, 240, 427/430.1, 384, 377, 378, 553, 162, 165, 108, 126.2, 126.3

[56] References Cited

U.S. PATENT DOCUMENTS

| | | | |
|---|---|---|---|
| 2,745,772 | 5/1956 | Cassman | 427/126.2 |
| 4,948,225 | 8/1990 | Rider et al. | 427/162 |
| 5,509,958 | 4/1996 | Van de Leest | 106/287.26 |
| 5,514,822 | 5/1996 | Scott et al. | 426/126.3 |

FOREIGN PATENT DOCUMENTS

| | | | |
|---|---|---|---|
| 0 736 578 A2 | 10/1996 | European Pat. Off. | C09D 5/00 |
| 2 738 392 | 3/1997 | France | H01J 17/49 |
| 09208851 | 8/1987 | Japan | C09D 1/00 |

OTHER PUBLICATIONS

Weber et al, Materials and Manufacturing Issues for Color Plasma Displays, MRS Bulletin, pp. 65–66, Mar., 1996.

Vest, G.M. et al, Synthesis of Metallo–Organic Compounds for MOD Powders and Films, Mat. Res. Soc. Symp Proc vol. 60, 1986.

Larry F. Weber and Jane D. Birk; "Materials and Manufacturing Issues for Color Plasma Displays"; MRS Bulletin / Mar. 1996; pp. 65 through 68, inclusive.

*Primary Examiner*—Janyce Bell
*Attorney, Agent, or Firm*—Duft, Graziano & Forest, P.C.

[57] ABSTRACT

A new method (P200) is provided for making magnesium oxide layers (122) in plasma displays (100). A magnesium carboxylate liquid precursor solution is applied to a display panel (102), dried, and annealed to yield a solid magnesium oxide layer (122) having excellent electro-optical performance.

18 Claims, 5 Drawing Sheets

FIG. 1
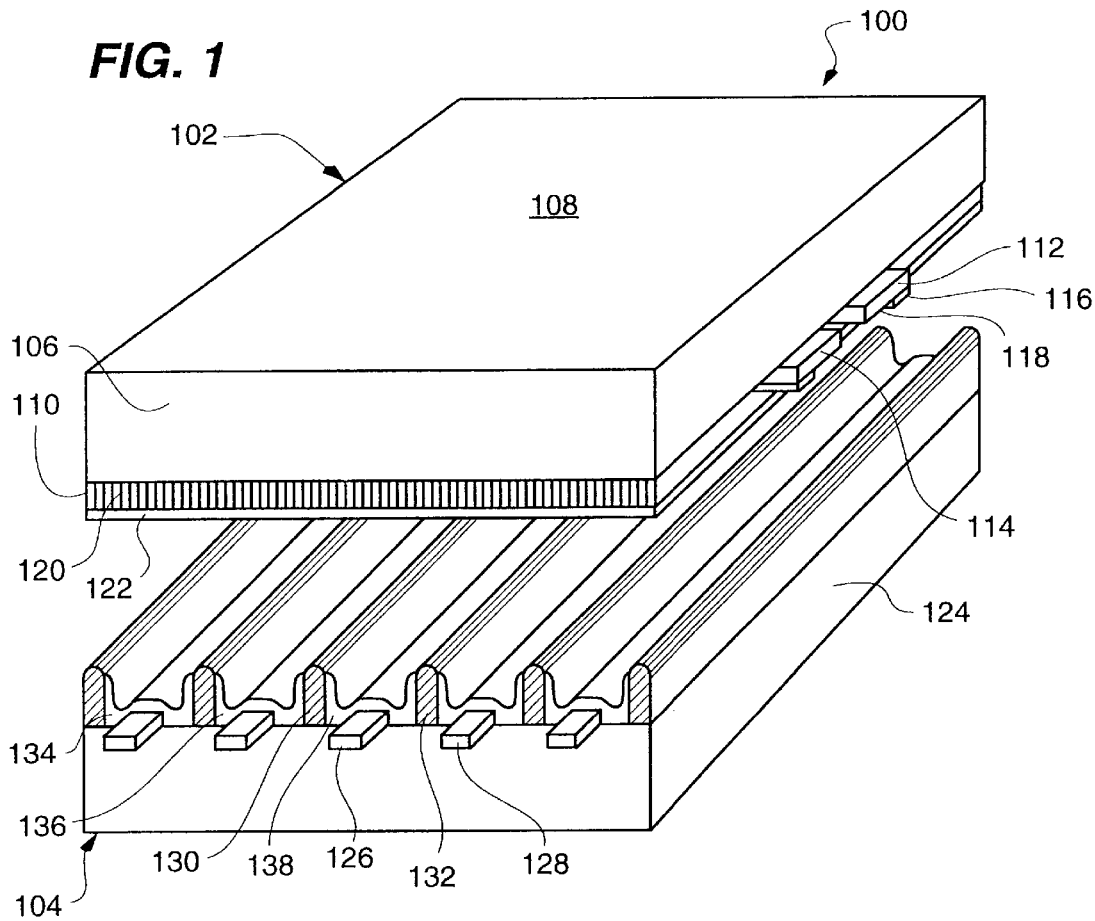
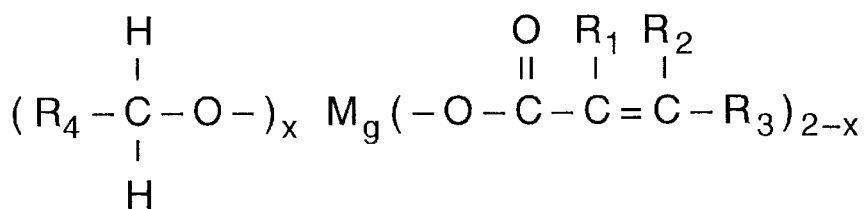
FIG. 3
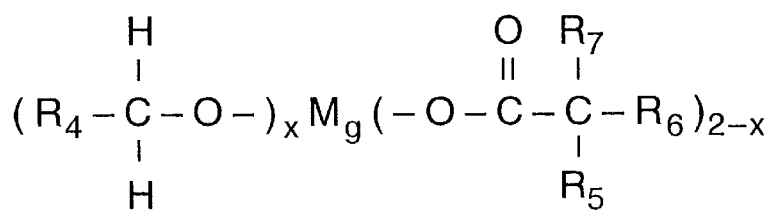
FIG. 4

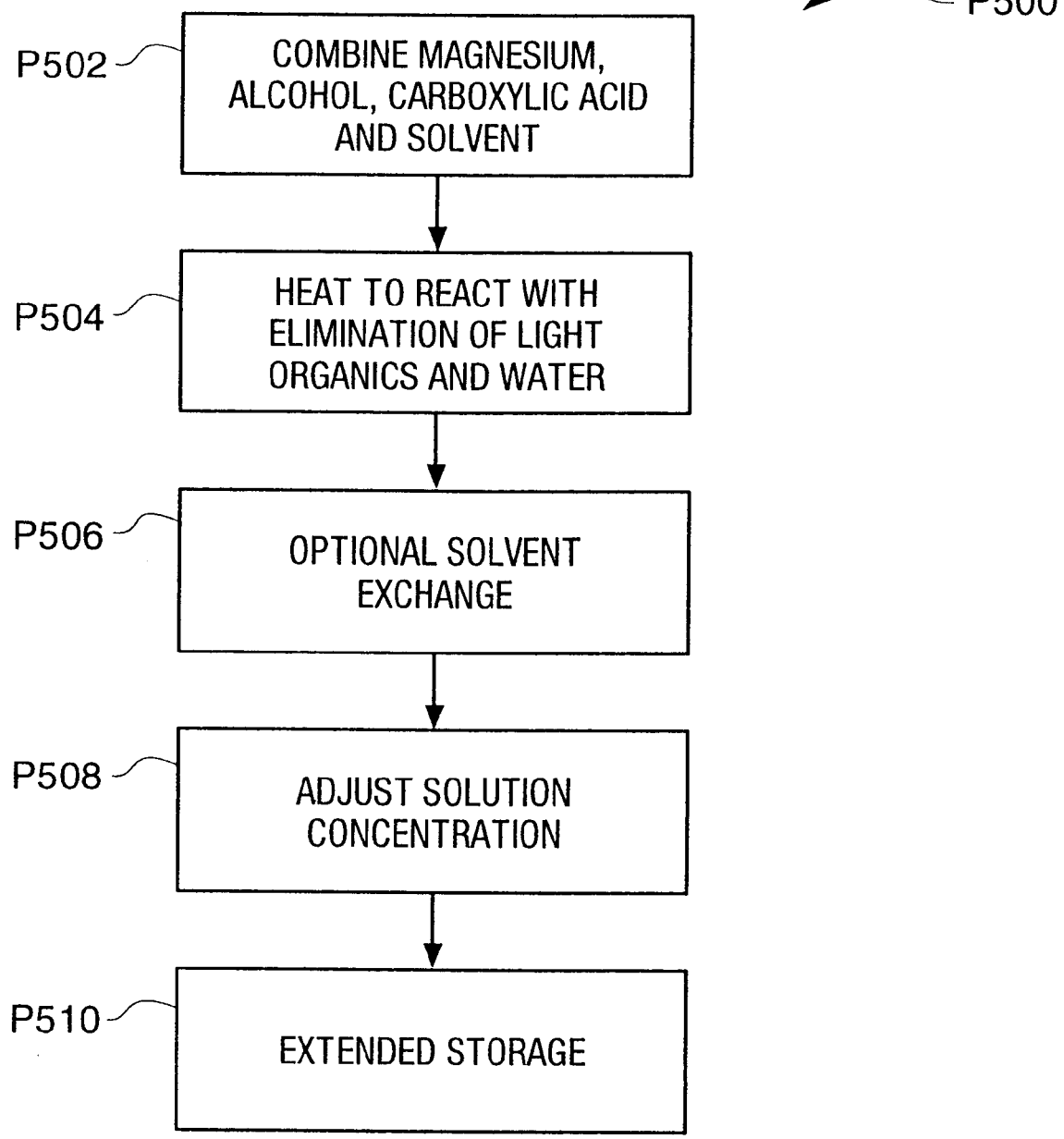

METHOD OF FORMING MAGNESIUM OXIDE FILMS ON GLASS SUBSTRATE FOR USE IN PLASMA DISPLAY PANELS

BACKGROUND OF THE INVENTION

1. Field of the Invention

The present invention involves methods and materials for coating large optical substrates with metal oxide films used in televisions and computer displays. More specifically, the methods and materials involve the use of a liquid precursor solution to deposit a corresponding magnesium oxide film on a plasma display panel.

2. Statement of the Problem

A variety of technologies are available to those who wish to build displays for electronically driven visual images. Some of these technologies include cathode ray tubes, electroluminescent displays, liquid crystal displays, plasma addressed liquid crystals, plasma display panels, vacuum fluorescent displays, and rear projection systems. Methods for producing large area displays, i.e., displays having a view-screen diagonal of greater than about fifteen or twenty inches, are associated with significantly increased process complexity and cost. Thus, not all technologies are cost-competitive when they are applied to the production of large area displays. Competitive technologies for use in the manufacture of large area displays include cathode ray tubes, plasma display panels, and rear projection systems.

Recent advances have shown that plasma display panels are the leading flat-panel technology for large area displays. It is possible to produce color plasma display panels having image quality and performance exceeding that which is obtainable from the bulkier cathode ray tubes. Rear projection systems are associated with inherent visual distortions, and these systems are also bulkier than plasma display panels. Plasma display panels may be scaled to any useful size.

Current plasma display panel research and development efforts focus on displays having view-screen diagonals ranging from about twenty to sixty inches. Large-scale prototype displays having view screen diagonals of about sixty inches have recently been produced, but low-cost manufacturing processes for large-scale plasma displays are still in the early stages of development.

Numerous problems in manufacturing development presently hinder full commercialization of large area plasma display panels. Weber et al, in *Materials and Manufacturing Issues for Color Plasma Displays*, MRS Bulletin, pp. 65–68 (March, 1996), describe a multitude of problems in manufacturing development for large-area color plasma display panels. These problems include visual distortion induced by barrier rib warpage and screen stretch during firing, visual distortion induced by a high firing temperature for dielectric glass, problems with existing magnesium oxide deposition techniques, phosphor degradation, and poor luminance efficiency. Dimensional changes as small as 0.1% are known to induce visual distortion through corresponding problems in registration of the plasma display panel electrodes. The Weber et al article indicates that these problems have not yet been solved.

State-of-the-art color plasma displays include a thin layer of magnesium oxide coating the interior surface of a front glass panel and a plurality of cathodes. This magnesium oxide layer is needed to protect the cathodes and eliminate erosion of the dielectric glass. Current practices for depositing this layer include the electron-beam evaporation of a magnesium oxide target in a high temperature vacuum chamber. The electron beam evaporation method is time-consuming and costly, but no suitable alternative is known. The Weber et al article, at page 67, indicates that possible alternative solutions to electron beam evaporation include sputtering and screen printing; however, the article also indicates that no satisfactory high-volume, low-cost alternative to electron beam deposition has yet been found.

There exists a true need for a high-volume, low-cost method of depositing magnesium oxide on large area plasma displays.

SOLUTION

The present invention overcomes the problems outlined above by providing a high-volume, low-cost method of depositing magnesium oxide films on large area plasma display panels and other large optical display substrates. The magnesium oxide deposition method provides extremely uniform magnesium oxide films having excellent electro-optical properties. The magnesium oxide deposition method avoids the complexity and expense of prior electron beam evaporation techniques.

The present invention in its broadest concept involves the use of a liquid precursor solution to form a thin layer of magnesium oxide on an optical substrate, e.g., quartz or soda-lime glass, which is operably configured for use in an electro-optical display. The methods of depositing a liquid precursor solution onto the optical substrate include spin-on deposition, misted deposition, dip-coating, and chemical vapor deposition. The liquid precursor solution includes a magnesium carboxylate dispersed in a solvent. The magnesium carboxylate has a molecular formula including from five to eleven carbon atoms. The liquid precursor solution is dried on the optical substrate to provide a dried precursor film. The dried precursor film is annealed under oxygen to produce a magnesium oxide layer on the optical substrate.

An especially preferred feature of the invention involves low temperature processing of the precursor material in the drying and annealing steps. This low temperature processing prevents thermal stress cracking of the optical substrate. The precursor drying step is preferably conducted at a temperature ranging from 120° C. to 180° C. followed by heating to a temperature ranging from 220° C. to 300° C. The most preferred drying conditions include heating the optical substrate on a hot plate or in an oven at a temperature of 150° C. for at least two minutes followed by heating at a temperature of 260° C. for at least four minutes. Annealing of the dried precursor film includes annealing at a temperature less than 500° C. The maximum anneal temperature is more preferably less than 450° C., and is most preferably about 400° C. for one hour.

The low anneal temperatures are sufficient to crystallize magnesium oxide, but the effects of incomplete calcination of the precursor solution are sometimes observed as organic trace elements around the outer edges of the optical substrate. Accordingly, it is a preferred feature of the invention to perform a preanneal step under an atmosphere that enhances the desorption of the organic materials in the precursor. These atmospheres include nitrogen atmospheres, inert gas atmospheres (e.g., argon), and reducing atmospheres such as a mixture of nitrogen and hydrogen. In the preanneal step, the optical substrate is preferably heated in an identical anneal profile with respect to the profile that is to be applied in the subsequent anneal under oxygen. The preanneal step facilitates breakdown and dissociation of the remaining organic portion of the precursor material from the metal oxide proportion without the formation of carbonaceous intermediate products. Thus, outer edges of the of the optical substrate remain clear.

Yet another preferred feature of the invention is the use of liquid precursor materials that may be polymerized either by exposure to heat or ultraviolet radiation. The polymerization reaction is useful in patterning the magnesium oxide layer, and also prevents visual distortion that may derive from beading or puddling of the melted precursor residue in the precursor drying process.

These and other features, objects, and advantages are apparent to those skilled in the art upon a reading of the detailed description below together with the associated drawings.

BRIEF DESCRIPTION OF THE DRAWINGS

FIG. 1 depicts a perspective sectional view of a color plasma display panel including a magnesium oxide layer produced according to the present invention;

FIG. 3 depicts a preferred magnesium carboxylate for use in the FIG. 2 process;

FIG. 4 depicts yet another preferred magnesium carboxylate for use in the FIG. 2 process;

FIG. 5 depicts a schematic process diagram of a method of making a precursor for use in the FIG. 2 process;

DETAILED DESCRIPTION OF THE PREFERRED EMBODIMENT

Figure 2:
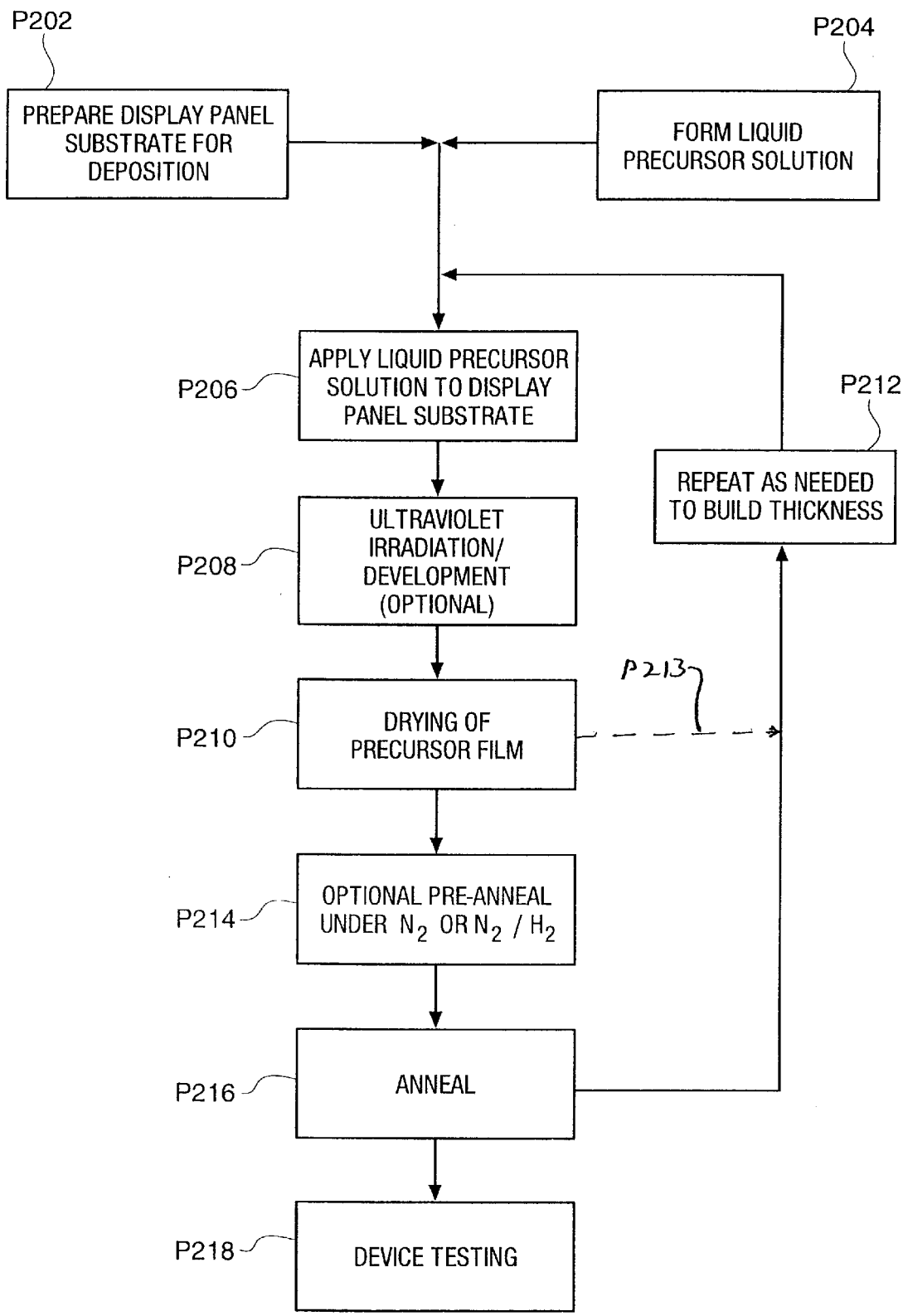
FIG. 2 depicts a schematic process diagram for use in forming magnesium oxide layers on plasma display panels according to the present invention.

FIG. 1 depicts a perspective sectional view of a preferred color plasma display panel 100 including a front panel 102 and a rear panel 104. Front panel 102 includes a first conventional soda-lime glass substrate 106 having a forward viewing surface 108 that is remote from interior surface 110. Interior surface 110 supports a plurality of parallel elongated cathodes, e.g., cathodes 112 and 114. As in the case of cathode 112, each cathode includes a corresponding bus electrode 116 and a sustain electrode 118. A dielectric glass layer 120 is deposited over interior surface 110 and the cathodes (e.g., cathodes 112 and 114). Dielectric glass layer 120 separates and insulates the respective cathodes.

Dielectric glass layer 120 is made of ground soda-lime glass that has been mixed with an organic binder and screen-printed over the cathodes on front panel 102. Front panel 102 is gradually reheated to about 600° C., which flows the screened dielectric glass layer 120. This temperature is close to but less than the melting point of front panel 102. Conventional practice is to place front panel 102 on a super-flat tile during heating and cooling to minimize distortion due to dimensional changes in front panel 102.

A magnesium oxide layer 122 covers dielectric glass layer 120. Magnesium oxide layer 122 protects cathodes 112 and 1147 and eliminates erosion of the dielectric glass layer 120 when plasma display panel 100 is operated. Magnesium oxide layer 122 lowers the voltage that is required to drive color plasma display 100, and increases the useful lifetime of the display.

Rear panel 104 includes a second conventional soda-lime glass substrate 124. A conventional ten-step screen printing process is used to deposit features on glass substrate 124 including a plurality of elongated parallel address electrodes, e.g., address electrodes 126 and 128, and a corresponding number of separators or glass barrier ribs, e.g., barrier ribs 130 and 132. These barrier ribs conventionally have a height of 130 μm, a width of 50 μm, and a pitch of 220 μm. A repetitive triad sequence of phosphors is deposited over the address electrodes between the barrier ribs, including red phosphor 134, green phosphor 136, and blue phosphor 138. Table 1 below shows typical materials that are used to make phosphors 134, 136, and 138.

TABLE 1

| TYPICAL PHOSPHOR MATERIALS | |
|---|---|
| Color | Material |
| Red | $(Y,Gd)BO_3:Eu$ |
| Blue | $BaMgAl_{14}O_{23}:Eu^{2+}$ |
| Green | $Zn_2SiO_4:Mn$ |

Color plasma display panel 100 corresponds to an industry-standard structure, which has recently been adopted by many leading plasma display manufacturers including Fujitsu, NEC, Mitsubishi, and Pioneer. The cathodes 112 and 114 of front panel 102 are oriented to place their respective longitudinal axes in an orthogonal orientation (at right angles) with respect to the longitudinal axes of address electrodes 126, 128 on rear panel 104. Thus, pixels automatically occur wherever the orthogonally oriented cathodes and/or electrodes overlap. Front panel 102 is placed over rear panel 104 with magnesium oxide layer 122 contacting the respective barrier ribs, e.g., barrier ribs 130 and 132. The space between panels 102 and 104 is filled with a mixture of xenon and neon gas, and the panels are hermetically sealed.

Color plasma display 100 generates light using the same principle as the fluorescent lamp. A difference in potential between the panels 102 and 104 causes the mixture of neon and xenon gas within the panels to discharge ultraviolet light. The ultraviolet light is absorbed by the proximate phosphor layer, which produces a corresponding visible light emission. Each plasma display pixel includes one subpixel each of the three primary red, green and blue subpixels. A color plasma display corresponding to that of FIG. 1 is capable of twenty-four bit color. A conventional digital addressing scheme enables each subpixel to have 256 intensity levels. Thus, 16.7 million colors can result from the various subpixel intensity combinations.

Color plasma display panel 100 is substantially identical to prior art color plasma display panels, except magnesium oxide layer 122 is produced using a completely new process, i.e., process P200 as shown in FIG. 2. Process P200 avoids the use of high-temperature vacuum electron beam evaporation, which was previously considered to be a costly but necessary step in the manufacturing process. Additionally, other conventional plasma display structures exist. Process P200 can be used in all alternative plasma display structures that use a metal oxide in place of magnesium oxide layer 122.

Step P202 includes the preparation of a plasma display panel for deposition of a magnesium oxide layer. With reference to FIG. 1, this preparation includes the conventional steps of screen printing cathodes 112 and 114 on soda-lime glass substrate 106, forming the corresponding bus electrodes 116 and sustain electrodes 118, and covering these electrodes with a dielectric glass layer 120. Step P202 includes the use of a suitable mask, as needed, to prevent or block the liquid precursor solution from contacting areas of soda-lime glass substrate 106 apart from dielectric glass layer 120. Even though these steps are discussed in the context of FIG. 1, step P202 also includes the conventional steps of forming on the optical substrate any layers that will underlie a magnesium oxide layer in any alternative plasma display panel structure.

Step P204 includes the formation of a liquid precursor solution that is to be deposited in the place of magnesium oxide layer 122. This precursor solution includes a solvent and a magnesium carboxylate having a molecular formula including from five to eleven carbon atoms. Shorter chain carboxylate groups are difficult to dissolve in appropriate concentrations, and longer carboxylate groups are increasingly associated with bubbling and cracking of the precursor films during subsequent drying and anneal steps. The molarity of the magnesium carboxylate preferably ranges from 0.3 to 0.6 moles per liter, and is most preferably 0.4 moles per liter.

The solvent is one which is capable of dissolving the metal carboxylate in an effective concentration for deposition and also wets the optical substrate in a uniform manner without beading. The solvent preferably has a boiling point exceeding that of water for purposes of distilling the precursor to eliminate water. Cosolvents may be used to enhance solubility of the magnesium carboxylate material. Cosolvents should be miscible with one another and may be compatibly mixed in differing proportions, especially between polar and apolar solvents, as needed to fully solubilize the precursor ingredients. Suitable solvents include n-octane and xylenes. Cosolvents may be used to improve solubility. Preferred cosolvents include 2-methoxyethanol, n-butyl acetate, 2-ethylhexanoic acid, and 2-ethylhexenoic acid. Other useful cosolvents include alcohols, such as 1-butanol, 1-pentanol, 2-pentanol, 1-hexanol, 2-hexanol, 3-hexanol, 2-ethyl-1-butanol, 2-methoxyethanol, 2-ethoxyethanol, and 2-methyl-1-pentanol; ketones, such as 2-hexanone (methyl butyl ketone), 4-methyl-2-pentanone (methyl isobutyl ketone), 3-heptanone (butyl ethyl ketone), and cyclohexanone; esters, such as butyl acetate, 2-methoxyethyl acetate, and 2-ethoxyethyl acetate; ethers, such as 2-methoxyethyl ether and 2-ethoxyethyl ether; and aromatic hydrocarbons, such as toluene and ethylbenzene.

FIG. 3 depicts a particularly preferred molecular formula for the metal carboxylate moiety wherein $R_1$, $R_2$, $R_3$, and $R_4$ are independently selected from the group consisting of hydrogen, alkyl, alkenyl, and alkynyl substituents. $R_1$, $R_2$, and $R_3$ in combination preferably have from two to eight carbon atoms. $R_4$ preferably has from three to ten carbon atoms. $R_1$, $R_2$, $R_3$, and $R_4$ are most preferably alkyl. X is a whole number ranging from zero to one, and is most preferably zero. The most preferred magnesium carboxylate according to FIG. 3 is one in which X is zero, $R_1$ is ethyl, $R_2$ is hydrogen, and $R_3$ is propyl.

The FIG. 3 formula is preferred for its alkene bond at the α-carbon, which facilitates thermal degradation of the magnesium carboxylate and polymerization of the precursor film. It is believed that the alkene bond is susceptible to thermally-induced polymerization. Thus, the liquid precursor solution polymerizes as it dries and, consequently, is less susceptible to melting with associated beading or puddling of the dried precursor residue.

The alkene bond of FIG. 3 is a polymerization site that is subject to free radical attack if a suitable photoinitiator is optionally placed in solution. Thus, the addition of materials that generate free radicals upon exposure to ultraviolet radiation provides a precursor solution that may be patterned by exposure to ultraviolet radiation under a radiation-blocking mask. Unexposed portions of the precursor film are removed in a developer solution, e.g., a 90:10 mixture of alcohol and water. This photoinitiated patterning eliminates the need for screen printing of the magnesium oxide layer, if such need arises. Photoinitiators are typically used in an amount ranging from about 0.01 mole percent to 0.2 mole percent of the final solution.

Suitable photoinitiators include 1-hydroxy-dimethylmethylphenylketone, 2,2-dimethoxy-2-phenylacetophenone, 1-hydroxy-cyclohexylphenylketone, 2,2'-azobis(2-methylproionitrile), 2,2-diethoxyacetophenone, 1-phenyl-2-hydroxy-2-methylpropane-1-one, 2-methyl-1-(4-methylthiophenyl)-2-molphorino-propane-1-one, 2,4,6-(trimethyl)benzoil diphenylphosphine oxide, benzoin ethers, and hydroxyacetophenones. Exemplary benzoin ethers include methylbenzoinmethylether, ethylbenzoinethylether, butylbenzoinbutylether, and iso-butylbenzoinisobutylether. Exemplary hydroxyacetophenones include 2-hydroxy-2-methyl-1-phenyl-propane-1-one, 1-(3,4-dimethyl)-2-hydroxy-2-methyl-propane-1-one, and 1-(4-isopropyl)-2-hydroxy-2-methyl-propane-1-one. Deep ultraviolet radiation having a wavelength ranging from 250 nm to 300 nm is preferred to initiate the polymerization reaction, as is a total energy delivery of at least about 500 milli-Joules during the term of exposure. The radiation wavelength and energy delivery may be varied, as required for interaction with a selected photo initiator.

FIG. 4 depicts an alternative molecular formula that is less preferred than the FIG. 3 formula because the FIG. 4 formula lacks an alkene bond. $R_4$, $R_5$, $R_6$, and $R_7$ are independently selected from the group consisting of hydrogen, alkyl, alkenyl, and alkynyl substituents. $R_4$, $R_5$, $R_6$, and $R_7$ are preferably alkyl. $R_4$ and X are as defined above with respect to FIG. 3. $R_5$, $R_6$, and $R_7$ in combination have from three to nine carbon atoms. In a most preferred sense, X is zero, $R_4$ is ethyl, $R_5$ is hydrogen, and $R_6$ is butyl. Low temperature processing of the FIG. 4 precursor according to the process of FIG. 2 yields magnesium oxide having a reduced degree of crystallinity, as compared to magnesium oxide materials derived from the FIG. 3 precursor.

Additional magnesium alkoxycarboxylate precursors may be used. These other precursors include those having a —O—Mg—O—Mg—O— group. These precursors are prepared as described in U.S. Pat. No. 5,468,679, which is hereby incorporated by reference to the same extent as though fully reproduced herein.

Step P206 of FIG. 2 includes applying the magnesium carboxylate liquid precursor solution from step P204 to the substrate of step P202. Preferred modes of precursor deposition include spin-on deposition, dip-coating, and misted deposition. The spin-on technique is most preferred, and includes placing the optical substrate in a standard spin-coating device and spinning it at an angular velocity ranging from about 500 rpm to about 2000 rpm with interior surface 110 (see FIG. 1) in an uppermost position. An aliquot (e.g. about 2 ml) of precursor solution is gradually dropped onto the spinning optical substrate to provide a film of precursor liquid coating the substrate.

Dip-coating involves placing the optical substrate in a bath of precursor liquid to coat all surfaces contacting the liquid. Misted deposition may be accomplished using the methods and apparatus described in U.S. Pat. No. 5,456,945 to McMillan et al, which is hereby incorporated by reference herein to the same extent as though fully disclosed herein. In this misted deposition technique, the forward plasma display panel 102 is substituted for the integrated circuit substrate of the '945 patent. Additionally, the aforementioned liquid precursor solution is substituted for the precursor solution described in the '945 patent.

P208 is an optional step in which the precursor liquid deposited in step P206 may be patterned by exposure to ultraviolet radiation. In cases where a magnesium carboxylate according to the molecular formula of FIG. 3 is used in combination with a photoinitiator ultraviolet radiation exposure initiates a free-radical polymerization reaction. Unexposed portions of the precursor film are not polymerized. Thus, the unexposed portions may be removed in an agitation bath of developer solution, e.g., a one minute bath in a 90:10 v/v mixture of ethanol and water, while the exposed portions remain on the optical substrate. This patterning technique avoids the need for screen printing and produces a much higher resolution pattern than that which is obtainable from screen printing techniques whenever it is desirable to form a pattern in the magnesium oxide layer. Alternatively, the entire layer of precursor solution may be exposed to ultraviolet radiation to polymerize the entire film. This exposure polymerizes the entire solution film to reduce or eliminate any incidence of beading or puddling of a melted dried precursor residue.

P210 is a drying step that preferably includes a multiple staged drying profile. The optical substrate is placed in an oven or on a hot plate at a first temperature ranging from 120° C. to 180° C. followed by heating to a second temperature ranging from 220° C. to 300° C. It is preferred that the second temperature exceed the first temperature by at least one-hundred degrees. The most preferred drying profile is 150° C. for two minutes, followed by 260° C. for four minutes. Step P210 removes the solvent from the liquid precursor film to leave a 'dried' precursor residue on the optical substrate. This drying of the precursor liquid prevents cracking and bubbling of the precursor film during subsequent anneal steps, which are performed at greater temperatures. The low temperature drying step P214 provides a thermally induced polymerization of the precursor solution when the magnesium carboxylate has an alkene bond. The polymerization reaction assists the production of magnesium oxide films having low visual distortion because the polymerized film is not susceptible to melting and puddling or beading.

Step P212 is a repetition of steps P206, P208, P210, P214, P216, and P218, as needed, to build thickness of the total magnesium oxide layer. The first pass through these steps using a 0.5 M liquid precursor solution generally yields a magnesium oxide layer having a thickness of about 1000 Å at the conclusion of process P200. Subsequent passes through these steps generally add about 600 Å to 800 Å in thickness. Alternatively, Step P212 may occur along line P213, which repeats only steps P206, P208, and P210. It is often possible to eliminate steps P214 and P216 in this manner because these steps are not normally needed unless step P206 has been conducted more than two or three times in a cycle.

Step P214 is an optional preanneal step that is designed to prevent blurring at the edges of the optical substrate due to carbonaceous residue resulting from incomplete calcination of the dried precursor residue of step P210. Step P214 includes baking of the optical substrate and dried precursor residue in an inert or reducing atmosphere, e.g., a 90:10 mixture of $N_2/H_2$ with diffusion furnace heating to a temperature of about 400° C. to 500° C. for fifty minutes to an hour and a half. This time includes a total of twenty minutes for a ten minute ramp or push into the furnace and a ten minute ramp or pull out of the furnace. The high temperature preanneal facilitates decomposition of the dried precursor residue while leaving behind magnesium metal and some oxygen from the precursor.

Step P216 includes an anneal under an oxygen-containing atmosphere to produce crystalline magnesium oxide from the precursor residue derived in step P210 or P214. This anneal may be conducted in air or under an oxygen flow. Atmospheric oxygen supplements any oxygen that remains from the precursor liquid to compensate defects in the magnesium oxide lattice. The anneal temperature preferably ranges from 400° C. to 500° C., and is more preferably less than 450° C. The most preferred anneal temperature is about 400° C. These low anneal temperatures were not obtainable from the prior art, and reduce the incidence of thermally induced stress fracturing of the optical substrate. If the preanneal of step P214 has been performed, the anneal profile of step P216 is preferably identical to the anneal profile of step P214. The most preferred anneal profile in step P216 is 400° C. for one hour and twenty minutes including ten minutes for a push into the furnace and ten minutes for a pull out of the furnace.

P218 is a quality control step that includes nondestructive testing of the device from step P216. These techniques include ultrasonic tests to detect hidden fractures in soda-lime glass 106 and optical distortion testing in which light from a source array is passed through front display panel 102 to reach an array of photovoltaic cells. Panel 102 may be rejected if the array of photovoltaic cells indicates that panel 102 provides excessive distortion of light originating from the source array.

FIG. 5 is a schematic process diagram P500 that provides additional detail with respect to the formation of a liquid precursor in step P204 of FIG. 2. Alternatively, suitable magnesium carboxylate materials can be purchased on commercial order from a number of vendors, such as Strem, Fischer, and Aldrich. It is also possible to make these materials according to the FIG. 5 process P500.

Step P502 includes mixing the various reagents and solvents according to an intended reaction plan for obtaining a specific magnesium carboxylate. The following generalized chemical reactions are useful in developing a reaction plan.

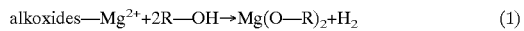  (1)

  (2)

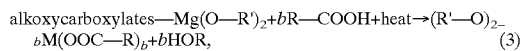  (3)

where b is a number of moles of carboxylic acid ranging from 0 to 2; R' is an alkyl, alkenyl, or alkynyl group having from 4 to 14 carbon atoms; and R is an alkyl, alkenyl, or alkynyl group having from 1 to 11 carbon atoms.

Alcohols that may be used preferably include methanol, 2-methoxyethanol, 1-butanol, 1-pentanol, 2-pentanol, 1-hexanol, 2-hexanol, 3-hexanol, 2-ethyl-1-butanol, 2-ethoxyethanol, and 2-methyl-1-pentanol. The alcohol is more preferably ethanol. Carboxylic acids that may be used preferably include 2-ethylhexanoic acid, octanoic acid, and neodecanoic acid. The most preferred carboxylic acid is 2-ethylhexenoic acid. It is preferred to add at least a 200% stoichiometric excess amount of carboxylic acid for purposes of driving the equilibrium of equation (3) towards substantially complete substitution of the alkoxide ligands.

Intermediate magnesium alkoxide reagents can be mixed in step P502 if they can be obtained from commercial sources in research grade purity. For example, where magnesium ethoxide is available, it is possible to substitute the ethoxide moiety with an acceptable carboxylate ligand by reacting the magnesium ethoxide with a carboxyic acid such as 2-ethylhexanoic acid according to Equation (3).

In step P502, magnesium metal spontaneously reacts with an alcohol (e.g., 2-methoxyethanol) in an exothermic reaction according to Equation (1). Additional heating in step P504 facilitates an endothermic process that produces a magnesium alkoxycarboxyl ate according to Equation (3). A reaction according to Equation (2) is also observed in the preferred mode when the unreacted magnesium is simultaneously combined with the alcohol and the carboxylic acid.

The simultaneous reactions of step P504 are preferably conducted in a reflux condenser that is heated by an oil bath having a temperature ranging from about 80° C. to about 120° C. over a period of time ranging from one to two days to permit substitution of the alkoxide moieties by carboxylate ligands. At the end of the initial one to two day reaction period, the reflux condenser is preferably opened to atmosphere, and the solution temperature is monitored to observe a fractional distillation plateau indicating the substantial elimination of all water and alcohol portions from the solution, i.e., a plateau exceeding at least about 70° C., at which time the solution is removed from the heat source.

In step P504, the mixture of metal-alkoxycarboxylates, metal-marboxylates and/or metal-alkoxides is heated and stirred as necessary to form metal-oxygen-metal bonds and boil off any low-boiling point organics that are produced by the reaction. According to a generalized reaction theory, oligomers may form with substantial heating over time, e.g.:

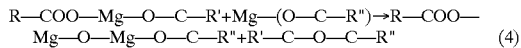

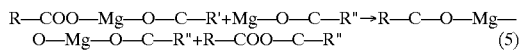

where R and R' are defined above; and R" is an alkyl, alkenyl, or alkynyl group preferably having from about zero to fifteen carbons.

The following reaction between a magnesium alkoxycarboxylate and a magnesium carboxylate can also occur:

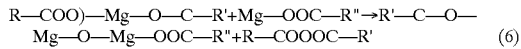

where R—COOOC—R' is an acid anhydride, and the terms are as defined above. This reaction requires considerably more heat than do the reactions (4) and (5) above, and proceeds at a much slower rate.

As used herein, the term "magnesium carboxylate" includes the magnesium-containing reaction products from any of Equations (2), (3), (4), (5), and (6).

Step P506 is an optional solvent exchange step. The reactions discussed above may be completed in a first solvent that facilitates the reaction, e.g., an ester solvent, and this may be replaced by a second solvent having a greater boiling point than the first solvent. The first solvent is distilled from solution. The second solvent can be selected for its excellent storage characteristics, e.g., an octane or xylenes solvent.

In step P508, the solution concentration of the liquid precursor is preferably adjusted to a molarity that is useful in a plasma display panel manufacturing process. This molarity preferably ranges from about 0.4M to about 0.6M in terms of the magnesium carboxylate concentration. The solution is mixed to substantial homogeneity.

Step P510 includes storage of the final solution for extended periods of time, If necessary, the solutions can be stored for periods of a year or more without substantial deterioration. The solutions resist hydrolysis and precipitation of magnesium metals from solution. The final solutions are preferably stored under an inert atmosphere of desiccated nitrogen or argon if the final solution will not be consumed within several days or weeks. This precaution in storage assures that the solutions are kept essentially water-free and avoids the deleterious effects of water-induced polymerization, viscous gelling, and precipitation of metallic moieties that water can induce in alkoxide ligands, if any such ligands remain in solution. The desiccated inert storage precaution is not strictly necessary when the final precursor solution, as is preferred, primarily consists of metals bonded to carboxylate ligands and alkoxycarboxylates.

The following working examples identify preferred materials and methods for use in practicing the present invention.

EXAMPLE 1

PREPARATION OF 0.4 MOLAR MAGNESIUM 2-ETHYL-2-HEXENOATE IN XYLENE

The materials identified in Table 2 below were weighed for use in a subsequent reaction.

TABLE 2

REAGENTS FOR MAGNESIUM OXIDE PRECURSOR

| Compound | Formula Weight (g/mol) | Mass (g) | mmol | Molar Equiv. | Vendor |
| --- | --- | --- | --- | --- | --- |
| magnesium ethoxide | 114.44 | 4.8146 | 42.0710 | 1.0000 | Aldrich |
| 2-ethylhexenoic acid | 142.20 | 62.8171 | 440.175 | 10.5001 | Aldrich |
| m-xylene | 40 ml | | | | |

Magnesium ethoxide (4.8146 g) was weighed directly into a 250 ml Erlenmeyer flask with a stir bar, and immersed in 10 ml of m-xylene. 2-ethyl hexenoic acid (62.8171 g) was weighed in a 100 ml beaker and poured into the Erlenmeyer flask. The beaker and erlenmeyer flask walls were rinsed with a total of 30 ml m-xylene. The Erlenmeyer flask was purged with nitrogen and fitted with a condenser under a slow nitrogen flow. The Erlenmeyer flask with condenser was placed in an 85° C. oil bath with magnetic stirring for twenty four hours. The solid magnesium ethoxide was observed to dissolve within about thirty minutes. The Erlenmeyer flask was fitted with a still head and condenser. The oil bath temperature was raised to 100° C. Liquid began distilling over at a head temperature of 60° C. Peak head temperature was 65° C., and fell to 35° C. in about four hours. The solution was cooled and diluted with 65 ml m-xylene to a 0.40 M concentration in a 250 ml graduated cylinder.

EXAMPLE 2

PREPARATION OF 0.4 MOLAR MAGNESIUM 2-ETHYL-2-HEXANOATE IN XYLENE

The procedure of Example 1 was repeated substituting an equivalent molar amount of 2-ethylhexanoic acid for the 2-ethylhexenoic acid of Example 1.

EXAMPLE 3

PRODUCTION OF A MAGNESIUM OXIDE FILM ON A QUARTZ SUBSTRATE

The preferred features of the process shown in FIG. 2 were used to produce a magnesium oxide film on a quartz wafer. A commercially available four-inch diameter quartz wafer was placed in a conventional spin-coating machine and spun at 1300 rpm. A 2 ml aliquot of the 0.4M magnesium 2-ethylhexenoate liquid precursor solution derived from Example 1 was dropped on the spinning wafer using an eyedropper. Spinning continued for thirty seconds after all of the precursor solution had been applied to the wafer.

The wafer including a coat of the precursor liquid was placed on a first hot plate heated to 150° C. for two minutes, removed from the first hot plate and placed on a second hot plate heated to 260° C. for four minutes. This hot plate heating occurred in air, and produced a dried precursor residue on the quartz wafer.

The wafer including the dried precursor residue was subjected to a furnace anneal in an oxygen diffusion furnace at 400° C. for fifty minutes. This time included a ten minute ramp into the furnace and a twenty minute ramp out of the furnace.

An isoscope was used to determine that the resultant magnesium oxide film had an index of refraction of 1.64. This index of refraction was used to determine that the magnesium oxide film had a thickness of 1000Å.

The steps of spin-on precursor deposition, drying, annealing, and thickness determination were repeated five more times. Table 3 below provides the isoscope results showing the additional thickness corresponding to each one of these repetitions.

TABLE 3

MgO THICKNESS CORRESPONDING TO ADDITIONAL PRECURSOR COATS

| Coating Sequence | Total MgO Thickness Å |
|---|---|
| 2 | 1750 |
| 3 | 2600 |
| 4 | 3200 |
| 5 | 4000 |
| 6 | 5000 |

EXAMPLE 3

X-RAY DIFFRACTION ANALYSIS

Figure 6:
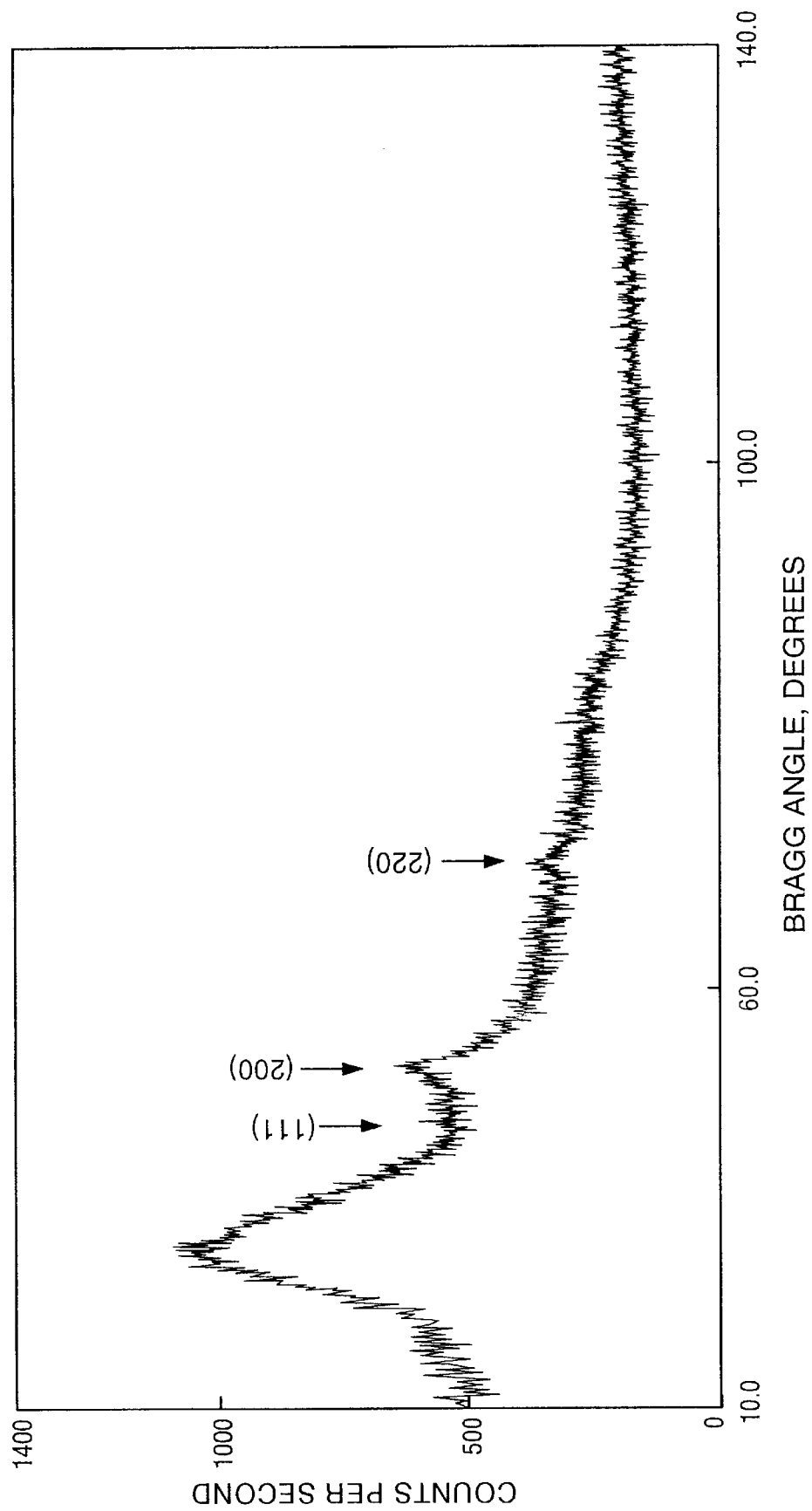
FIG. 6 depicts an X-ray diffraction plot of results obtained from a magnesium oxide film produced according to the FIG. 2 process.

The procedure of Example 2 was repeated for a single precursor application through the first anneal. The resultant MgO film was subjected to conventional X-ray diffraction analysis. FIG. 6 depicts the results as a plot of the X-ray intensity in counts per second on the Y-axis and the Bragg angle on the X-axis. The resultant cure is typical of crystalline magnesium oxide. The (111), (200) and (220) peaks are marked on the curve.

EXAMPLE 4

SCANNING ELECTRON MICROSCOPY

Figure 7:
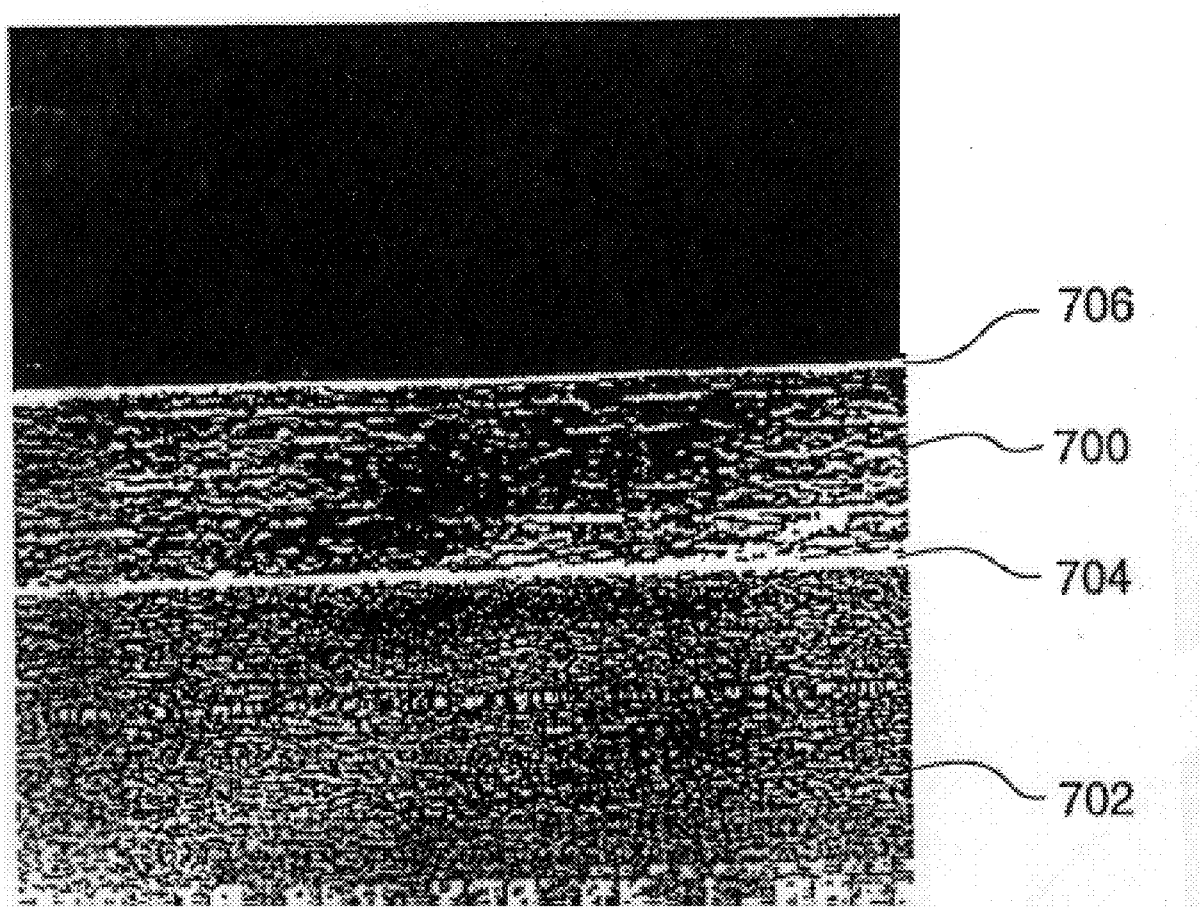
FIG. 7 depicts a scanning electron micrograph of a magnesium oxide film produced according to the FIG. 2 process.

The procedure of Example 2 was repeated for a single precursor application through the first anneal. The resultant quartz wafer with MgO was cut to provide a cross-section, and subjected to conventional scanning electron microscopy. FIG. 7 depicts an example micrograph with the results being obtained at a 30,000× magnification. FIG. 7 shows a low porosity magnesium oxide layer 700 formed over quartz layer 702. Excellent bonding properties exist at the interlayer boundary 704. Magnesium oxide layer 700 presents a substantially planarized outer surface 706 and a uniform thickness.

Those skilled in the art understand that the preferred embodiments described above may be subjected to apparent modifications without departing from the true scope and spirit of the invention. The inventors hereby state their intention to rely upon the Doctrine of Equivalents, in order to protect their full rights in the invention.

We claim:

1. A method of coating an optical substrate with a layer of magnesium oxide for use in electro-optical displays, said method comprising the steps of:

coating a surface of an optical substrate with a liquid precursor solution including a magnesium carboxylate portion dispersed in a solvent, said magnesium carboxylate portion having from five to eleven carbon atoms;

drying said liquid precursor solution on said optical substrate to provide a dried precursor film;

heating said dried precursor film in oxygen to produce a magnesium oxide layer on said optical substrate.

2. The method as set forth in claim 1 wherein said step of coating a surface includes use of said liquid precursor solution having a molecular formula

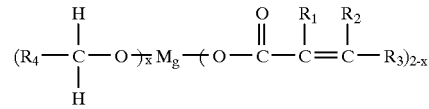

wherein X is a whole number ranging from zero to one; $R_1$, $R_2$, $R_3$, and $R_4$ are independently selected from the group consisting of hydrogen, alkyl, alkenyl, and alkynyl substituents; $R_1$, $R_2$, and $R_3$ in combination have from two to eight carbon atoms; and $R_4$ has from three to ten carbon atoms.

3. The method as set forth in claim 2 wherein X is zero, $R_1$ is ethyl, $R_2$ is hydrogen, and $R_3$ is propyl.

4. The method as set forth in claim 1 wherein said step of coating a surface includes use of said liquid precursor solution having a molecular formula

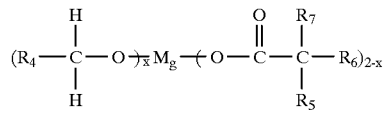

wherein X is a whole number ranging from zero to one; $R_4$, $R_5$, and $R_7$ are independently selected from the group consisting of hydrogen, alkyl, alkenyl, and alkynyl substituents; $R_4$ has from three to ten carbon atoms; and $R_5$, $R_6$, and $R_7$ in combination have from three to nine carbon atoms.

5. The method as set forth in claim 4 wherein X is zero, $R_5$ is ethyl, $R_6$ is hydrogen, and $R_7$ is butyl.

6. The method as set forth in claim 1 wherein said step of coating a surface includes spinning said liquid precursor solution onto said optical substrate.

7. The method as set forth in claim 1 wherein said step of coating a surface includes misting said liquid precursor solution onto said optical substrate.

8. The method as set forth in claim 1 wherein said step of coating a surface includes dip-coating said liquid precursor solution onto said optical substrate.

9. The method as set forth in claim 1 wherein said liquid precursor solution includes a photoinitiator and a metal carboxylate having an alkene bond and said method further includes a step of exposing said liquid precursor to ultraviolet radiation after said step of coating said substrate.

10. The method as set forth in claim 1 wherein said step of drying said liquid precursor solution includes heating at a temperature ranging from 120° C. to 180° C. followed by heating to a temperature ranging from 220° C. to 300° C.

11. The method as set forth in claim 1 wherein said step of drying said liquid precursor solution includes heating at a temperature of 150° C. for at least two minutes followed by heating at a temperature of 260° C. for at least four minutes.

12. The method as set forth in claim 1 wherein said step of heating said dried precursor film includes heating at a temperature less than 500° C.

13. The method as set forth in claim 1 wherein said step of heating said dried precursor film includes heating at a temperature less than 450° C.

14. The method as set forth in claim 1 wherein said step of heating said dried precursor film includes heating at a temperature less than about 400° C.

15. The method as set forth in claim 1 including a second step of heating said dried precursor film in an atmosphere selected from the group consisting of nitrogen and a mixture of nitrogen and hydrogen, said step of heating said dried precursor film occurring before said step of heating said dried precursor residue in oxygen.

16. The method as set forth in claim 1 including steps of forming electrodes on said optical substrate and covering said electrodes with dielectric glass, wherein said steps of forming electrodes and covering said electrodes are performed prior to said step of coating a surface.

17. A method of coating an optical substrate with a layer of magnesium oxide for use in electro-optical displays, said method comprising the steps of:

coating a surface of an optical substrate with a liquid precursor solution including a magnesium carboxylate portion dispersed in a solvent, said magnesium carboxylate portion having from five to eleven carbon atoms;

drying said liquid precursor solution on said optical substrate to provide a dried precursor film, wherein said step of drying said liquid precursor solution includes heating at a temperature ranging from 120° C. to 180° C. followed by heating to a temperature ranging from 220° C. to 300° C.; and annealing said dried precursor film to produce a magnesium oxide layer on said optical substrate.

18. A method of coating an optical substrate with a layer of magnesium oxide for use in electro-optical displays, said method comprising the steps of:

coating a surface of an optical substrate with a liquid precursor solution including a magnesium carboxylate portion dispersed in a solvent, said magnesium carboxylate portion having from five to eleven carbon atoms, wherein said step of coating a surface includes misting said liquid precursor solution onto said optical substrate;

drying said liquid precursor solution on said optical substrate to provide a dried precursor film; and annealing said dried precursor film to produce a magnesium oxide layer on said optical substrate.

* * * * *